(12) United States Patent
Friedrich et al.

(10) Patent No.: US 9,879,440 B2
(45) Date of Patent: Jan. 30, 2018

(54) FIBER REINFORCED RESIN POLYMER MORTAR POLE

(75) Inventors: Ralph S. Friedrich, Hermosa Beach, CA (US); Ron G. Ulrich, Huntington Beach, CA (US); James W. Davidson, Cypress, TX (US); Hector P. Mercado, Wichita Falls, TX (US); David B. Jones, Iowa Park, TX (US); Ronald A. Viegl, Wichita Falls, TX (US); Liming Chen, Wichita Falls, TX (US)

(73) Assignee: NOV North America I/P, LLC, Houston, TX (US)

( * ) Notice: Subject to any disclaimer, the term of this patent is extended or adjusted under 35 U.S.C. 154(b) by 1157 days.

(21) Appl. No.: 11/548,653

(22) Filed: Oct. 11, 2006

(65) Prior Publication Data

US 2008/0087371 A1    Apr. 17, 2008

(51) Int. Cl.
| | |
|---|---|
| *B29D 22/00* | (2006.01) |
| *E04H 12/02* | (2006.01) |
| *B29C 53/60* | (2006.01) |
| *B29C 70/20* | (2006.01) |
| *B29C 70/32* | (2006.01) |

(Continued)

(52) U.S. Cl.
CPC ............ *E04H 12/02* (2013.01); *B29C 53/60* (2013.01); *B29C 70/205* (2013.01); *B29C 70/32* (2013.01); *B29C 70/50* (2013.01); *B29C 53/8058* (2013.01); *B29C 53/8075* (2013.01); *B29L 2031/766* (2013.01); *Y10T 428/1393* (2015.01)

(58) Field of Classification Search
CPC .............. B29L 2031/766; E04H 12/02; Y10T 428/1393; Y10T 428/1362; Y10T 428/1372; Y10T 428/139; Y10T 428/24132; B29C 70/50; B29C 70/32; B29C 53/60; B29C 70/205; B29C 53/8075; B29C 53/8058; B32B 13/08; B32B 1/08

USPC ............................................. 428/35.7–36.92
See application file for complete search history.

(56) References Cited

U.S. PATENT DOCUMENTS

| | | | |
|---|---|---|---|
| 3,429,758 | A | 2/1969 | Young |
| 3,483,896 | A | 12/1969 | Grosh |

(Continued)

OTHER PUBLICATIONS

European Search Report, dated Nov. 21, 2012, total 9 pages.

(Continued)

*Primary Examiner* — Elizabeth M Cole
(74) *Attorney, Agent, or Firm* — Derek V. Forinash; Porter Hedges LLP

(57) ABSTRACT

Poles of this invention have an annular body with a wall structure comprising a number of fiber reinforced resin layers, which can be positioned to form an inside and/or outside portion of the wall structure. A portion of the layers are oriented longitudinally within the wall structure, and the wall structure also includes radially-oriented fiber reinforced resin layers. The pole includes one or more layers or a core of a composite material or polymer mortar disposed within one or more locations of the wall structure, e.g., as an intermediate layer and/or as part of the wall inside and/or outside portion. The pole can include an outside surface resistant to ultra violet radiation. Poles of this invention can be formed using a continuous process on a rotating mandrel, making use of differently positioned stations to form the different portions of the pole as the fabrication is moved axially along the mandrel.

11 Claims, 5 Drawing Sheets

(51) Int. Cl.
 *B29C 70/50* (2006.01)
 B29C 53/80 (2006.01)
 B29L 31/00 (2006.01)

(56) References Cited

U.S. PATENT DOCUMENTS

| | | | |
|---|---|---|---|
| 3,598,275 A * | 8/1971 | Francois | 220/675 |
| 3,742,985 A | 7/1973 | Rubenstein | |
| 3,854,504 A * | 12/1974 | Morrison et al. | 138/141 |
| 3,884,269 A * | 5/1975 | Schetty et al. | 138/137 |
| 3,896,858 A | 7/1975 | Whatley | |
| 3,974,012 A * | 8/1976 | Hogarth | 156/161 |
| 4,007,075 A | 2/1977 | McClain et al. | |
| 4,200,605 A | 4/1980 | Imamura et al. | |
| 4,243,075 A | 1/1981 | McPherson et al. | |
| 4,417,937 A | 11/1983 | Escher et al. | |
| 5,082,701 A * | 1/1992 | Craven et al. | 428/34.5 |
| 5,556,673 A | 9/1996 | Giraud | |
| 5,628,425 A | 5/1997 | Sharp | |
| 6,048,594 A | 4/2000 | Greene | |
| 6,605,343 B1 * | 8/2003 | Motoi et al. | 428/298.1 |
| 6,746,747 B2 * | 6/2004 | Davies et al. | 428/113 |
| 2003/0196391 A1 | 10/2003 | Hayes et al. | |

OTHER PUBLICATIONS

Non-Final office action in U.S. Appl. No. 13/029,921 dated Feb. 14, 2013, total 18 pages.
Non-Final Office Action in U.S. Appl. No. 13/029,921 dated Jun. 13, 2012, total 23 pages.

\* cited by examiner

FIBER REINFORCED RESIN POLYMER MORTAR POLE

FIELD OF THE INVENTION

This invention relates to poles used for a variety of applications such for carrying and supporting utility power lines or the like and, more particularly, to poles that are specially constructed from fiber reinforced resin having one or more polymer mortar layers for the purpose of providing a cost effective structure having optimized compressive and tensile strength for providing a resistance to bending stress well suited for use in conventional pole applications.

BACKGROUND OF THE INVENTION

The use of poles are well known for such applications as for carrying utility power lines and the like, for accommodating the placement of lights thereon, or for accommodating the placement of other devices thereon a desired distance from the ground. Such poles have been conventionally formed from solid wood, steel, aluminum, or concrete having a desired thickness or outside diameter, and have also been formed from metal having an inside and outside diameter designed to provide a desired wall thickness.

A key factor to consider when designing a pole for a particular use is the compressive and tensile strength and modulus that the pole must possess to provide a desired degree of bending strength and stiffness. On the compressive side of the pole, local buckling resistance may also be needed for the particular pole application. When working with solid materials such as wood or concrete, the desired resistance to buckling is provided by the diameter of the pole and the solid wall construction. When working with metal materials, or other materials that are not provided in the form of a solid pole construction, the resistance to buckling is provided by the local wall thickness of the structure.

In addition to solid wood or concrete poles and poles made from metal having a defined wall thickness (i.e., having an annular construction), it is known to make poles from fiber reinforced materials, such as fiberglass reinforced resin. In one example embodiment, such known fiberglass poles have an annular wall structure formed entirely from fiberglass windings, i.e., that comprise a number of layers formed from fiberglass strips that are impregnated with resin. In such known example, the pole structure comprises an inside diameter wall formed from a plurality of radial windings of resin impregnated fiberglass ribbon, intermediate layers provided in the form of a number of longitudinally positioned resin impregnated fiberglass strips that are individually cut to length and positioned along the length of the pole at various locations and that are disposed over the underlying radial windings, and an outermost layer of resin reinforced fiberglass strips that are also individually cut and positioned longitudinally along a length of the pole and disposed over at least a portion of the underlying intermediate layer.

While the above example demonstrates that is it known to form a pole from fiberglass reinforced resin materials, the reliance on multiple layers of fiberglass reinforced resin material to build the wall thickness needed to provide a desired compressive strength and resistance to buckling results in the production of a pole that is relatively expensive compared to more traditional materials based on the raw material costs.

A composite pole manufactured as described above has the following structural issues: (1) the tensile strength of the longitudinally oriented fibers is very high and imparts the bulk of the strength in the tensile direction; (2) the longitudinally oriented fibers however do not have the same compressive strength as they do tensile strength. The reason for this is that the fibers can reach their full strength in tension because they do not rely on the resin matrix to do so. In compression however, the fibers rely in the resin matrix to not buckle the very small glass fibers in compression. This phenomenon results in tensile strength in the axial oriented fibers that may be 6 to 10 higher than the corresponding compressive strength. (3) In designing for local wall buckling under compression (i.e., the full local wall thickness), the local wall may fail in buckling long before the compressive strength is reached. Therefore, it is desired that an optimum pole design would have equal tensile and compressive strength and the wall thickness would be sufficient to avoid local buckling before compressive crush strength.

Further, the process described above for making a single pole by the sequentially performed steps noted above including cutting and laying individual strips of the fiberglass reinforced resin material forming the intermediate and outer layers, is one that is time consuming and costly from a manufacturing perspective.

Accordingly, it is desired that a pole construction be developed that overcomes some or all or the above noted deficiencies. Namely, it is desired that a pole be constructed from a fiber reinforced resin material in a manner that enables the realization of optimal tensile and compressive strength for providing a desired resistance to bending stress or buckling for accommodating use with popular pole applications such as for carrying utility or power lines. It is further desired that the construction of such a pole be one that is relatively more cost effective to build from a manufacturing and/or raw materials perspective when compared to conventional fiberglass reinforced resin poles. Finally, it is desired that such a pole be manufactured in a manner that does not require the use of exotic machinery, and that can be made from raw materials that are readily available.

SUMMARY OF THE INVENTION

Fiber reinforced resin poles of this invention comprise a generally annular body having a wall structure that is defined between a pole inside and outside diameter, and having a length that extends axially between opposed pole ends. Poles of this invention have a wall structure comprising a number of fiber reinforced resin layers. The fiber reinforced resin layers can be positioned to form an inside portion of the wall structure, or an inside wall structure, and an outside portion of the wall structure, or an outside wall structure. In an example embodiment, a portion of the layers used to form the pole wall structure is oriented longitudinally within the wall structure substantially parallel to an axis running along the pole length.

The longitudinally-oriented fiber reinforced resin layers can be disposed within the inside and/or the outside portion of the wall structure depending on the particular pole configuration as called for by the pole end-use application. The wall structure can also include radially-oriented fiber reinforced resin layers that can be disposed within the inside and/or outside portion of the wall structure. The radially-oriented fiber reinforced resin layers are oriented at an angle between about 70 to 90 degrees relative to an axis running along the pole length. In an example embodiment, poles of this invention are formed having a wall structure comprising at least 50 percent longitudinally-oriented fiber reinforced resin layers.

Additionally, fiber reinforced resin poles of this invention include one or more layers of a core of composite material comprising a plurality of particulate material that is dispersed within a continuous region of hardened material. In an example embodiment, the composite material is a polymer mortar material comprising a solid constituent and a liquid constituent. In an example embodiment, the polymer mortar material solid constituent is sand and the liquid constituent is a hardenable/curable resin material. In an example embodiment, the one or more layers of composite material comprises a repeated arrangement of the composite material and a carrier material positioned adjacent the composite material.

The composite material is preferably disposed between the fiber reinforced resin layers. The exact placement position of the composite material within the pole wall structure can vary. For example, the composite material can be positioned intermediate the inside and outside wall portions. Additionally, the composite material can be positioned at more than one location in the pole wall structure, e.g., it can be positioned intermediate the inside and outside wall portions and it can also be positioned within one or both of the inside and outside wall portions.

Fiber reinforced resin poles of this invention can further include an outside surface that is resistant to ultra violet radiation. Such outside surface can be provided in the form of a surface coating formed from a material that is resistant to ultra violet radiation selected from the group of materials consisting of cured resin materials, particulate materials, and mixtures thereof.

Fiber reinforced resin poles of this invention are preferably formed using a continuous process on a rotating mandrel, making use of different sequentially position stations to form the different portions of the pole as the fabrication is being moved axially along the mandrel. Poles of this invention enable one to tailor the construction features in a manner calculated to realize optimal tensile and compressive strength for providing a desired resistance to bending stress or buckling for accommodating use with popular pole applications, e.g., for carrying utility or power lines or the like. Poles of this invention that are constructed using a continuous process that enables one to use different materials for making different portions of the pole, thereby introducing manufacturing flexibility into the fabrication process to assist in achieving a pole construction having the above-noted desired optimized properties.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

Fiber reinforced resin poles of this invention generally comprise a composite construction including a fiber reinforced resin structure including a plurality of axially-oriented fiber reinforced resin layers and one or more polymer mortar material layers, wherein such construction is specially engineered having combined properties of tensile strength and compression strength calculated to provide a desired axial tensile strength, axial compressive strength, and resistance to buckling to meet the particular end-use application conditions of the pole.

As explained in greater detail below, in an example embodiment, poles of this invention are preferably constructed using a continuous process, and the polymer mortar material is provided in the form of one or more layers within the pole to cost effectively provide a desired wall thickness to the pole structure to provide a desired compression strength. Further, poles of this invention use longitudinally- or axially-oriented fiber reinforced resin layers, also using the above-noted continuous process, for the purpose of providing a desired axial tensile strength. Still further, fiber reinforced resin poles of this invention can include an outermost surface that has been coated or otherwise treated to provide improved resistance to weathering and ultra violet (UV) effects.

Figure 1:
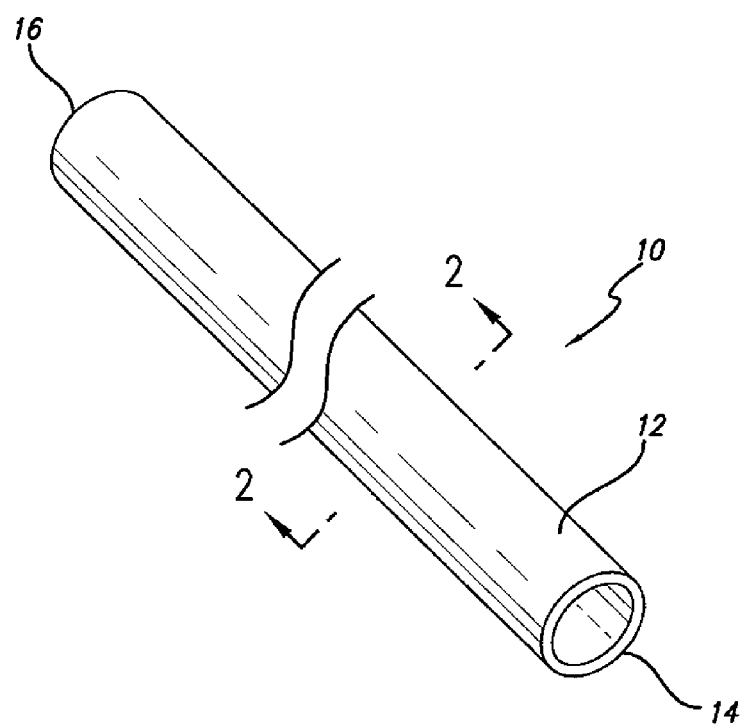
FIG. 1 is a perspective side view of an example embodiment fiber reinforced resin pole as constructed according to the principles of the invention.

FIG. 1 illustrates an example embodiment fiber reinforced pole 10 constructed in accordance with the principles of this invention. The pole 10 of this example embodiment generally has a cylindrical outer surface 12 with an axial length that is defined by opposed pole ends 14 and 16. In this particular example, the pole 10 has an outer surface having a circular cross-sectional geometry giving rise to a cylindrical construction. However, it is to be understood that poles of this invention can have outside surfaces that are configured differently than that illustrated in FIG. 1. For example, poles of this invention can be configured having an outer surface 12 characterized by a non-circular cross section, e.g., one that is hexagonal, octagonal, or the like defined by a sequence of flat surfaces rather than by a continuous round surface. Alternatively, rather than being non-circular and defined by a number of sequential flat surfaces, the pole can have an oval geometrical structure.

Further, while poles of this invention are illustrated in FIG. 1 as having a constant outside diameter, it is to be understood that poles of this invention can be configured having an outside surface 12 defined by two or more different diameter sections, e.g., having a first outside diameter section positioned near a base portion of the pole that is different than a second outside diameter section positioned near a top portion of the pole. In such an example, the first diameter section can be greater than the second diameter section. Additionally, the different diameter sections can be stepped or tapered.

Figure 2:
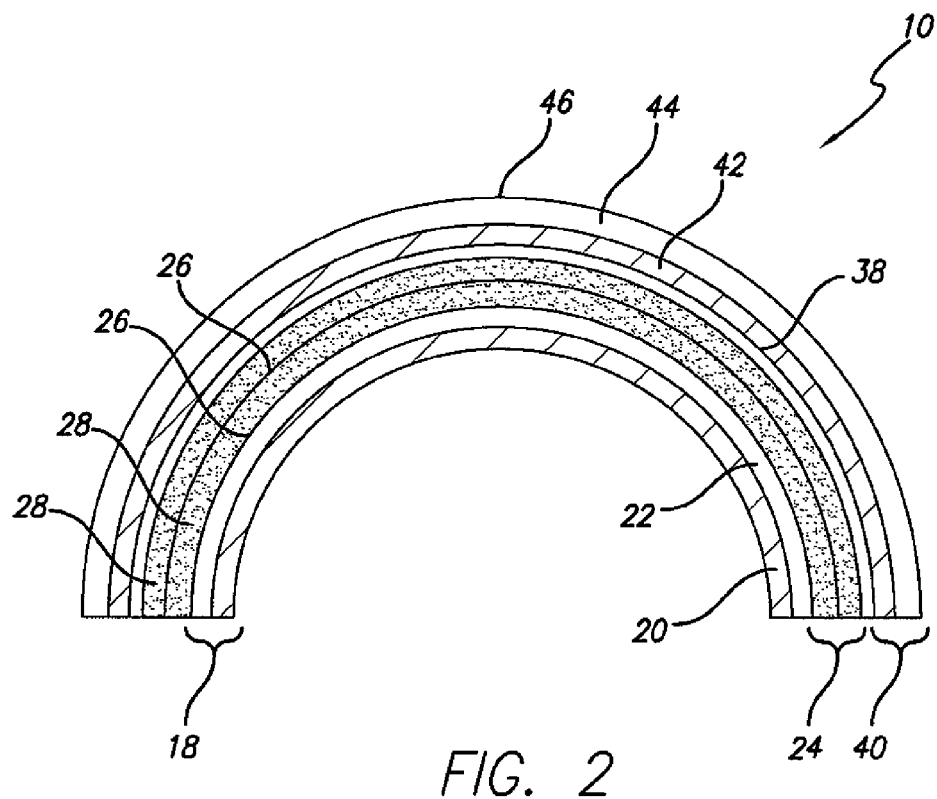
FIG. 2 is a cross-sectional section view taken along section 2-2 of the pole illustrated in FIG. 1.

Referring now to FIG. 2, in such example embodiment, moving radially outwardly from a position within the pole, the pole 10 includes an inside wall structure 18 that is formed from a plurality of fiber reinforced resin layers. In an example embodiment, the reinforcing fiber material used to form the inside wall structure can be selected from those fibrous materials conventionally used to form fiber reinforced resin pipe. Examples of suitable reinforcing fiber materials useful for forming the inside wall structure include conventional filament materials such as glass, carbon, Kevlar and the like, and combinations thereof. In a preferred embodiment, the reinforcing fiber is glass that is made by, for example, PPG of various yields as called for by the particular end-use pole application The resin component useful for forming the inside wall structure 18 includes those that are conventionally used to form fiber reinforced resin pipe. In an example embodiment, the resin component that is used to impregnate or wet the reinforcing fiber can be any thermosetting or thermoplastic resin used in winding or laminating procedures, and may be selected from the group of resins that include polyester resins, vinyl ester resins, phenolic resins, urethane resins, melamine-formaldehyde resins, epoxy resins, urea-formaldehyde resins, phenol-formaldehyde resins, polyvinyl chloride resins, polyvinylidene chloride resins, silicones, silanes, siloxanes, acrylics, and mixtures thereof. If desired, the resin component can include siloxane modification, or the presence of silicon in some other form. Other resin materials that can be used in include epoxy-terminated butadiene nitrite (ETBN) and/or carboxyl-terminated polymer butadiene (CTBN)

The inside wall structure 18 is constructed so that a sufficient amount of the resin component is used to wet and bond together the different layers of the reinforcing fiber material. The inside wall structure 18 may comprise in the range of from about 10 to 40 percent by weight of the resin component. In a preferred embodiment, the inside wall structure 18 comprises approximately 20 percent by weight resin. However, it is to be understood that the exact amount of the resin component that is used to form the inside structural wall can and will vary depending on such factors as the type of materials used for the resin itself, the type of material used for the reinforcing fiber, and the particular pole end-use application. In an example embodiment, the resin is applied to the reinforcing fiber material by a conventional application technique, such as by running the fiber material through a resin bath or the like.

The pole inside wall structure 18 is formed using a continuous process, wherein the layers of fiber reinforced resin material are applied to an underlying mandrel in a continuous manner as the pole is being moved axially along different process stations in a conveyor-like manner over the mandrel. In an example embodiment, the inside wall structure 18 comprises a plurality of fiber reinforced resin tows or rovings 20 that are positioned or oriented axially relative to the pole, i.e., that are positioned longitudinally at a near zero degree angle relative to the axis of the mandrel or inside diameter of the pole.

In an example embodiment, the axially-oriented rovings can be provided by distributing them evenly around the circumference, e.g., providing full 360 degree coverage. It is to be understood that the exact width, spacing and/or overlap of the individual axially-oriented rovings can and will vary depending on such factors as the types of resin material and/or reinforcing fiber material selected, the pole diameter, and the end-use pole application.

The inside wall structure 18 can additionally include reinforcing fiber windings 22 that are applied or wound radially around the mandrel at a desired angle relative to the mandrel. Such radial windings can be applied onto the mandrel prior to application of the axial windings and/or can be disposed onto the axial windings after they have been application. It is to be understood that the exact ordering of the radial and axial windings used to form the pole inside wall structure can and will vary depending on the particular end-use pole application.

In an example embodiment, such radially-oriented fiber reinforced resin windings can be wound at an angle in the range of from 70 to 90 degrees relative to the axis of the mandrel, that will vary depending on the diameter of the structure and on the lead per revolution.

In an example embodiment, the inside wall structure 18 includes some amount of the radially-wound fiber reinforced resin windings 22 for the purpose of acting as a crack stopper between the axially-oriented fiber reinforced resin strips 20, and/or to provide a desired degree of ring crush resistance for through bolt clamping loads and/or for resisting ovalization of the pole under bending stress.

In an example embodiment, the radially-oriented windings 22 can be wound onto the mandrel using a lead per revolution of the mandrel equal to the roving band width and in the range of from about 0.5 to 6 inches, preferably in the range of from about 1 to 4, and more preferably in the range of from about 1 to 1.5 inches. It is to be understood that the exact width of the radially-oriented windings can and will vary depending on such factors as the types of reinforcing fiber material selected, the pole diameter, and the end-use pole application.

In an example embodiment, the inside wall structure 18 can comprise at least 50 percent axially-oriented rovings, and preferably from about 70 to 90 percent axially-oriented rovings 20. The inside wall structure can comprise at least about 5 percent radially-oriented fiber reinforced resin windings, and preferably comprises in the range of from about 10 to 30 percent radially-oriented fiber reinforced resin windings 22.

In an example embodiment, the inside wall structure 18 is formed by first disposing a number of radially-oriented fiber reinforced resin windings 20 onto an underlying mandrel. In an example embodiment, the mandrel is first covered with a desired release material, e.g., formed from paper or the like, that is designed to facilitate axial movement of the material layers subsequently disposed thereon in conveyor-like fashion to facilitate forming the pole using a continuous/uninterrupted process. The radially-oriented windings 20 are positioned along the mandrel with their longitudinal edges preferably abutting one another or overlapping one another. Alternatively, the radially-oriented windings can be positioned such that there is a desired amount of space between adjacent bands. In a preferred embodiment, the radially-oriented windings are positioned such that their radial edges are touching relative to one another.

Alternatively, the inside wall structure can be formed by first applying one or more axially-oriented fiber reinforced resin rovings onto the mandrel.

After the radially-oriented fiber reinforced resin windings have been applied, the inside wall structure 18 is further formed by disposing a number of axially-oriented fiber reinforced resin rovings 20 onto the underlying radial windings. The axially-oriented fiber reinforced resin rovings 20 are positioned along the mandrel with their longitudinal edges preferably abutting one another or overlapping one another. Alternatively, the axially-oriented rovings can be positioned such that there is a desired amount of space between adjacent rovings. In a preferred embodiment, the axial rovings are positioned such that their longitudinal edges are touching relative one another.

The thickness of the inside wall structure 18 will vary depending on the particular pole end-use application. Additionally, the inside wall structure can be made from multiple layers of axially- and/or radially-oriented fiber reinforced resin materials, that may be ordered differently depending on the particular pole application. In an example embodiment, where the pole has a length of approximately 45 feet and is adapted for use in carrying a minimum load of approximately 2,400 pounds, the pole is constructed having an inside wall structure thickness in the range of from about 0.025 to 0.1 inches, and preferably in the range of from about 0.06 to 0.08 inches.

Moving radially outwardly from the inside wall structure 18, the pole 10 comprises a composite material intermediate layer or core 24. In an example embodiment, the composite material is a polymer mortar material. As used herein, the term "polymer mortar" is understood to refer to any type compound comprising at least one liquid constituent and at least one solid constituent that when combined together form a readily conformable material mixture. Additionally, it is desirable that the polymer mortar material be capable of curing to a hardened state, and be capable of doing so with minimal shrinkage and having some degree of flexibility. Thus, it is desired that the constituent materials used to form the polymer mortar material be selected to promote the formation of a strong bond when in the cured or hardened state among the constituent materials. It is further desired that the polymer mortar be formed from constituent materials such that when in the hardened or cured state they contribute a desired level of compressive strength to the pole structure. In a preferred embodiment, the resin or liquid constituent that is used to form the polymer mortar includes a coupling agent, e.g., a silicon compound such as a silane or the like, to improve the bond that is formed with the solid constituent when provided in the form of sand.

The types of liquid constituent useful for forming the polymer mortar include polymer materials that are capable of contributing one or more of the properties noted above for the polymer mortar, and can include resin materials such as those used to form conventional fiber reinforced resin pipe. In an example embodiment, it is desired that the liquid constituent be one that cures or otherwise transforms to a hardened state under heated or ambient conditions, and while in such hardened state be one that displays some degree of flexibility. In an example embodiment, the liquid constituent is selected from the same group of resin materials described above with reference to the inside wall structure. In a preferred embodiment, the liquid constituent is an epoxy resin, such as an anhydride cured epoxy.

The types of solid constituents useful for forming the polymer mortar include particulate matter that is capable of contributing one or more of the properties noted above for the polymer mortar. In an example embodiment, it is desired that the solid constituent be one that provides the property of compressive strength to the hardened polymer mortar, and ideally is one that does so at a raw material cost that is economically desirable. Example solid constituent materials useful for forming the polymer mortar include sand, other types of silica-based particulate matter, crushed concrete, crushed rock, crushed granite, clay, calcium carbonate, and other types of widely available crushed particulate material, and mixtures thereof.

The size of the solid constituent used to form the polymer mortar can vary as a function of the type of liquid constituent that is used, the type of the solid constituent material that is selected, and the particular end-use application for the pole. In an example embodiment, the solid constituent can have an average particle size in the range of from about 0.02 to 0.08 inches, and more preferably in the range of from about 0.06 to 0.07 inches. Additionally, the solid constituent material can comprise a monomodal distribution of a single particle size, or can comprise multi-modal distribution of a number of different particle sized solid constituents. For example, the solid constituent can include a combination of differently sized particles that are specially selected and proportioned to provide a desired degree of packing density or the like to the polymer mortar. In a preferred embodiment, clay can be used as a filler to the liquid component to reduce cost and improve compressive strength by increased particle fillers.

In addition to the above-discussed liquid and solid constituents, the polymer mortar can include other optional constituent materials that for example can be selected to promote certain desired properties. In an example embodiment, the polymer mortar can include a constituent material that promotes adhesion, e.g., an adhesion promoter or coupling agent, that enhances the bond strength between the solid and liquid constituents, thereby increasing the tensile and/or compressive strength of the polymer mortar. In the example where sand is used as the solid constituent, the use of an amine or amino-functional ingredient has proven useful for increasing the bond strength of the sand to the liquid constituent in the hardened polymer mortar, in some cases has improved compressive strength to up to three times. In the example polymer mortar composition discussed above, comprising sand and epoxy, an amine coupling agent is used.

Other types of materials that can be optionally included in the polymer mortar include fibrous materials, such as chopped fibers, used in conjunction with the solid and liquid constituents to provide further desired properties to the hardened polymer mortar. For example, the addition of chopped fibers could be used for the purpose of keeping the polymer mortar, e.g., the sand particles within the polymer mortar, together if the polymer mortar is cracked when subjected to a tension load condition. The types and sizes of fibers that are used can vary and can be selected from the same types of reinforcing fiber materials disclosed above for the inside wall structure. While the use of fibers has been disclosed as one example type of optional solid constituent that can be used, it is understood that other types of solid materials can also be used such as those formed from plastic, metal, ceramic, or elastomeric materials, or mixtures thereof.

The amount of the liquid constituent in the polymer mortar relative to the solid constituent can and will vary depending on a number of factors such as the types of liquid and solid constituents used, the particle size of the solid constituent, and the particular pole end-use application. In an example embodiment, the polymer mortar comprises in the range of from about 75 to 95 percent by weight solid constituent based on the total weight of the polymer mortar, and preferably in the range of from about 85 to 95 percent by weight solid constituent. In an example embodiment, the polymer mortar comprises in the range of from about 5 to 18 percent by weight liquid constituent based on the total weight of the polymer mortar, and preferably in the range of from about 7 to 12 percent by weight liquid constituent. The solid constituent is further broken down between sand and clay particles, wherein the sand may comprise in the range of from 80 to 90 percent of the total solid constituent weight and the clay in the range of from 10 to 30 percent of the total solid constituent weight.

The optional liquid and solid materials disclosed above, such as additives, adhesion promoters, flow control agents, fibers and the like, in the polymer mortar can be present up to about 10 percent by weight, and preferably up to about 3 percent by weight based on the total weight of the polymer mortar. It is understood that the amount of these optional constituents can and will vary based on many of the same factors noted above for the solid and liquid constituents.

As described in greater detail below, in the example embodiment illustrated in FIG. 2, the polymer mortar intermediate layer or core 24 is provided in the form of a layered construction comprising a layered structure of repeated polymer mortar 26 and a carrier material 28. Generally, the inside wall structure 18 is surrounded with one or more repeated layers of the polymer mortar and carrier material. This repeated structure is formed by the process of applying the polymer mortar onto the underlying pole structure (which can be the inside wall structure or a carrier material already wrapping a preexisting layer of polymer mortar), and then wrapping the applied polymer mortar with the desired carrier material, thus forming a jelly roll construction of polymer mortar and carrier material. In a preferred embodiment, this is done as part of a continuous process.

In an example embodiment, the thickness of each polymer mortar layer 26 can and will vary depending on the particular pole end-use application. In an example embodiment, each polymer mortar layer has a thickness in the range of from about 0.02 to 0.08 inches, and preferably in the range of from about 0.06 to 0.07 inches. It is to be understood that the thickness of each polymer mortar layer can be the same or different, and that the thickness of the polymer mortar layer can vary axially within the pole structure.

The type of carrier material used for forming the intermediate layer or polymer mortar core is preferably one that is capable of functioning as a carrier for a resin material that is used to wet, saturate, or impregnate the carrier material. In an example embodiment, the carrier material can be provided in the form of a fabric or paper material, e.g., that is provided in the form of a low-cost veil having the basic function of keeping the underlying polymer mortar layer in place during the process of building up the polymer mortar core to a desired wall thickness. In a preferred embodiment, this is done by wetting the carrier material with the desired liquid constituent, winding it onto an underlying structure of the pole, applying a desired amount of the solid constituent onto the just-applied carrier material, wherein the winding of carrier material operates to hold down an underlying polymer mortar layer.

Accordingly, it is desired that the carrier material be selected from those types of materials that can be wetted or impregnated with a desired resin material or liquid constituent, and that can hold the polymer mortar layer in place during subsequent building of the polymer mortar layer or core. Additionally, it is desired that the carrier material that is selected be capable of providing some degree of reinforcement to the polymer mortar intermediate layer or core for the purpose of providing some degree of crack stopping reinforcement, e.g., to help control the propagation of any cracks that may develop within the pole structure.

Carrier materials suitable for use in forming the polymer mortar intermediate layer or core include reinforcing fiber materials such as the same types noted above for use in forming the inside wall structure 18, e.g., including glass, nylon, polyester, paper and the like. In an example embodiment, the carrier material is fabric or paper. In a preferred embodiment, the carrier material has a width in the range of from about 0.5 to 4 inches, and preferably in the range of from about 1 to 1.5 inches. The exact width of the fabric material can and will vary depending on such factors as the types of fabric material selected, the type of resin material selected, the types of material used to form the polymer mortar, the lead per revolution of the pole, and the end-use pole application.

In an example embodiment, it is desired that the carrier material have a relatively thin thickness so that the bulk of the polymer mortar intermediate layer or core 24 is made up primarily of the polymer mortar material.

As noted above, in an example embodiment, the carrier material is wetted, saturated or impregnated with a desired resin material. Suitable resin materials useful for this purpose include those discussed above for forming the inside wall structure and/or for forming the polymer mortar composition. Ideally, the resin material is one that will form a desired bond with the polymer mortar and with any subsequent winding that the pole structure may include. In an example embodiment, the resin material is an epoxy.

In an example embodiment, the carrier material 28 is wetted, saturated or impregnated with the desired resin material and is applied or wound radially around the underlying polymer mortar layer 26 at a desired angle relative to the mandrel that will provide full coverage of the mandrel. In an example embodiment, the carrier material can be wound at an angle in the range of from about 85 to 89 degrees relative to the axis of the mandrel, and preferably at an angle in the range of from about 87 to 89 degrees. It is to be understood that the actual wind angle can and will vary depending on the lead per revolution of the pole.

Accordingly, in the example embodiment illustrated in FIG. 2, the polymer mortar intermediate layer or core 24 comprises, moving radially outwardly from the axis of the pole, a repeated arrangement of polymer mortar layers 26 and carrier material layers 28. In such embodiment, this repeated arrangement of polymer mortar layers and carrier material layers is continued until a desired polymer mortar core wall thickness is achieved. The number of polymer mortar layers will vary depending on a number of factors that include the types of materials used to form the polymer mortar and fabric, the thickness of each layer, as well as the desired wall thickness for the pole structure. This wall thickness will vary depending on the particular end-use pole application. In an example embodiment, the wall thickness is sufficient to provide a degree of compressive crush strength and buckling resistance to accommodate the pole end-use application, e.g., the load of the pole and the load that the pole will be carrying when placed into service.

If desired, rather that using a reformed carrier material for forming the polymer mortar layer or core, the carrier material can itself be formed during the process of making the polymer mortar later or core. In such an example embodiment, the carrier material can be formed by dispensing chopped fiber or the like onto polymer mortar liquid and solid constituents that have been dispensed onto the pole structure. In such embodiment, radial rovings are then wound around the dispensed chopped fiber and are used to tie down such fibers thereby forming a fiber matter or carrier material during the process of forming the polymer mortar layer. In an example embodiment, radial rovings are dispensed onto pole structure such that a gap exists between adjacent edges of the radial rovings, and the chopped fiber should be sized having a length that is sufficient so that a majority of the chopped fiber is trapped between the adjacent rovings. In an example embodiment, the chopped fibers are sized having a length of about two times that of the gap between adjacent radial rovings. Configured in this manner, the carrier material or mat is formed in situ during the formation of the polymer mortar layer or core by the combined chopped fiber and radial rovings.

The example embodiment pole illustrated in FIG. 2 presents an example pole construction comprising two layers of the polymer mortar material. It is to be understood that this was provided for purposes of reference and is not intended to be limiting of the actual number of polymer mortar layers poles of this invention can include. Additionally, it is to be understood that the relative thicknesses of the layers illustrated in FIG. 1 are provided again for purposes of reference and are not intended to be limiting as to the actual thickness of the different layers of materials used to form poles of this invention.

In an example embodiment, where the pole has a length of approximately 45 feet and is adapted for use in carrying a load of approximately 2,400 pounds as measured laterally to the axis of the pole at a distance of approximately two feet from a tip of the pole. Such example pole is constructed having a set or polymer mortar intermediate layers or total polymer core wall thickness in the range of from about 0.2 to 0.4 inches, and preferably in the range of from about 0.25 to 0.35 inches made from multiple layers of polymer mortar material and carrier material. These layers may be dispersed between multiple structural layers or concentrated all in one location within the pole structural wall.

Figure 3:
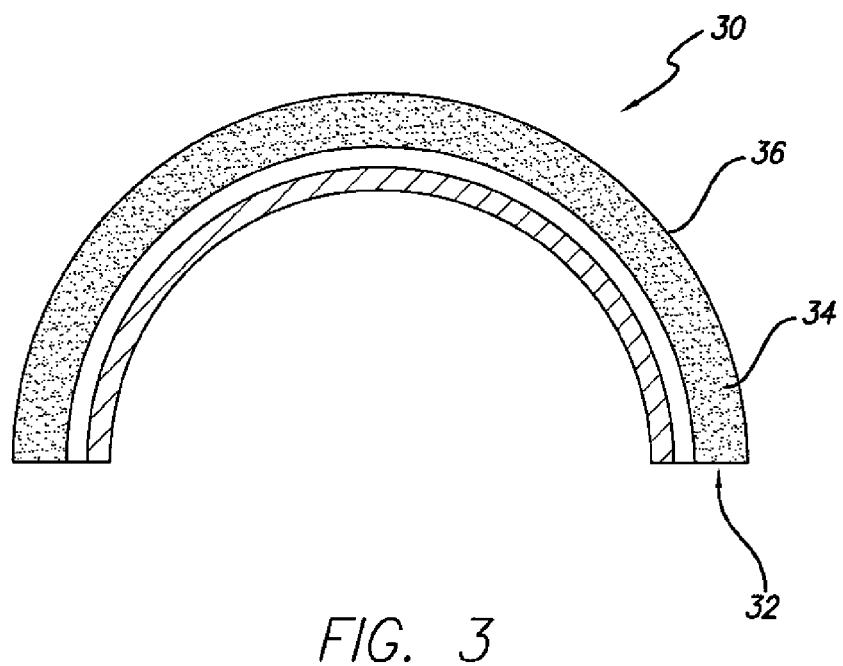
FIG. 3 is a cross-sectional section view of an alternative embodiment of the pole of this invention.

Referring to FIG. 3, rather than being formed from a number of repeated polymer mortar layers and carrier material layers, fiber reinforced resin poles 30 of this invention may comprise a polymer mortar intermediate layer or core 32 provided in the form of a single layer of polymer mortar 34 having a wall thickness that is calculated to provide a desired degree of compressive strength and/or local buckling resistance for the particular end-use pole application. In such an embodiment, it may be desired to form the polymer mortar using a special combination of solid constituent, liquid constituent, and optional additives to permit the formation of a single polymer mortar layer 24 having a desired wall thickness without intervening windings of a carrier material. In an example embodiment, a single winding of carrier material 36 around the outside surface of the polymer mortar 34 may be used if desired to keep the polymer mortar core 36 in place during the continuous manufacturing process.

Referring back to FIG. 2, moving radially outwardly from the polymer mortar intermediate layer or core 24, the pole can include one or more layers of hoop roving 38 disposed over the underlying polymer mortar layer or core 24. The hoop roving 38 can be used to aid in further consolidating the underlying polymer mortar layer or core and hold the polymer mortar layer or core in a consolidated state, which is desired for the purpose of achieving a desired polymer mortar layer packing density that will yield the desired compression resistance.

The hoop roving comprises a fiber reinforced resin material and can be formed from the same reinforcing fiber materials and resin materials discussed above for forming the inside wall structure. In an example embodiment, the hoop roving 38 is provided in the form of a fiberglass tow material band that is wetted, saturated or impregnated with an epoxy resin material. In such example embodiment, the hoop roving band has a width in the range of from about 0.5 to 4 inches, and preferably in the range of from about 1 to 1.5 inches. The hoop roving provided in a continuous process, and has a wind angle in the range of from about 85 to 89 degrees relative to the axis of the pole, and preferably at an angle in the range of from about 87 to 89 degrees. The wind angle for the hoop roving can vary depending on the lead/revolution of the pole and the pole diameter.

In an example embodiment, the hoop roving band 38 may be provided in the form of a single layer of material, or as multiple layers of material. In an example embodiment, the hoop roving band is provided in the form of a single layer. The total thickness of the hoop roving used to form poles of this invention can and will vary, but can be in the range of from about 0.005 to 0.02 inches, and preferably in the range of from about 0.01 to 0.015 inches.

In an example embodiment, the hoop roving is part of an outside wall structure 40 having a fiber reinforced resin structure. Accordingly, the outside wall structure 40 operates to sandwich the polymer mortar intermediate layer or core 24 between it and the inside wall structure 18. The reinforcing fiber materials and resin materials useful for forming the outside wall structure 40 can be selected from the same group of reinforcing fiber materials and resins discussed above for forming the inside wall structure 18. The reinforcing fiber material that is disposed over the underlying hoop roving is wetted, impregnated or saturated with the resin.

The outside wall structure 40 is constructed so that a sufficient amount of the resin component is used to wet and bond together the reinforcing fiber layers. The outside wall structure 40 may comprise in the range of from about 10 to 40 percent by weight of the resin component. In a preferred embodiment, the outside wall structure 40 comprises approximately 20 percent by weight resin. However, it is to be understood that the exact amount of the resin component that is used to form the outside wall structure can and will vary depending on such factors as the type of materials used for the reinforcing fiber and the particular pole application. In an example embodiment, the resin is applied to the reinforcing fiber by a conventional application technique, such as by running the fiber through a resin bath.

In a preferred embodiment, the pole outside wall structure 40 is formed in a continuous process, wherein the reinforcing fiber layers are applied to the underlying hoop roving in a continuous manner rather than as separate precut sheets or strips. In an example embodiment, the outside wall structure 40 comprises a plurality of fiber reinforced resin rovings or tows 42 that are positioned or oriented axially relative to the pole, i.e., that are positioned longitudinally at a near zero degree angle relative to the axis of the mandrel or inside diameter of the pole.

In an example embodiment, the evenly spaced axially-oriented fiber reinforced resin rovings or tows 42 can be provided based on a total tow count of from 84 to 168 tows, and the yield of the specific tows. It is to be understood that the exact count and yield of the axially-oriented tows used to form the outside wall structure 40 can and will vary depending on such factors as the type of resin and/or reinforcing fiber selected, the pole diameter, and the end-use pole application. Additionally, the number of axial tows, tow yields and the like may also be depend on the construction of the inside wall structure 18, e.g., the extent of axial rovings that were used to form the same. Because the pole functions mainly as a loaded cantilever bending member, and the moment of inertia increases with the forth power of diameter, the presence of axial rovings in the outside wall structure is more effective in optimizing the pole structural performance.

However, it is to be understood that the outside wall structure 40 can additionally include fiber reinforced resin windings 44, in addition to the radial roving, that are applied or wound radially around the axial rovings at a desired angle relative to the pole axis. In an example embodiment, such radially-oriented fiber reinforced resin windings 44 can be wound at an angle in the range of from about 87 to 89 degrees relative to the axis of the pole, and preferably at an angle in the range of from about 88 to 89 degrees.

In an example embodiment, like the inside wall structure 18, the outside wall structure 40 can also include some amount of the radially-oriented fiber reinforced resin windings 44 for the purpose of acting as a crack stopper between the axially-oriented rovings 42, and/or to provide a desired degree of crush resistance for through bolt clamping loads and/or for resisting ovalization of the pole under bending stress.

In an example embodiment, the radially-oriented windings 44 can be provided having a width in the range of from about 0.5 to 4 inches. Like for the axially-oriented rovings 42, it is to be understood that the exact width of the radially-oriented windings 44 can and will vary depending on such factors as the types of resin and/or reinforcing fiber selected, the construction of the inside wall structure, and the pole end-use application.

In an example embodiment, the outside wall structure 40 can comprise at least 50 percent axially-oriented rovings 42, preferably in the range of from about 70 to 90 percent axially-oriented rovings 42, and in the range of from about 10 to 30 percent radially-oriented fiber reinforced resin windings 44.

In an example embodiment, the outside wall structure 40 is formed by first disposing a number of hoop rovings onto the underlying pole surface for the purpose of consolidating the underlying polymer mortar intermediate layer or core. A number of the axially-oriented rovings 42 are then disposed onto the surface of the underlying hoop rovings. The axially-oriented rovings are positioned along the underlying pole surface with their longitudinal edges preferably abutting one another or overlapping with one another. Alternatively, the axial rovings can be positioned such that there is a desired amount of space between adjacent windings. In a preferred embodiment, the axial rovings are positioned such that their longitudinal edges are touching relative to one another.

While a particular example embodiment of the pole is illustrated in FIG. 2, as having its inside and outside wall structures formed from a particular arrangement of axially and radially oriented fiber reinforced resin layers, it is to be understood the poles of the invention can comprise axially and radially-oriented fiber reinforced resin layers that are arranged differently than as illustrated.

The thickness of the outside wall structure 40 will vary depending on the particular pole application. In an example embodiment, where the pole has a length of approximately 45 feet and is adapted for use in carrying a load of approximately 2,400 pounds, the pole is constructed having an outside wall structure thickness in the range of from about 0.05 to 0.1 inches, and preferably in the range of from about 0.06 to 0.8 inches. Again, it is to be understood that the exact thickness of the outside wall structure can and will depend on such factors as the construction of the inside wall structure 18, the construction of the polymer mortar intermediate layer or core 24, the construction of the hoop rovings 38, and the materials used to form the axially-oriented rovings.

It is desired that poles constructed in accordance with the principles of this invention include an outermost layer that has been treated or otherwise constructed to provide a desired degree of weather and resistance to ultra violet (UV) rays or radiation. It is known that poles having conventional fiberglass reinforced resin constructions suffer from inadequate UV resistance as the polyester and/or epoxy resins that are used to make such conventional poles are subject to UV degradation.

Poles of this invention are constructed having an outer surface 46 formed from a material that is designed to provide a desired degree of weatherablity and UV resistance for a particular pole end-use application. The desired UV resistance can be achieved by either providing a pole outside surface formed from a material that is designed to act as a barrier or ablate over time as it degrades, by using a relatively thicker outer surface, and/or by using specially formulated compositions or the like that themselves provide a higher level of UV resistance, and/or a combination of the two.

In an example embodiment, the pole 10 includes an outermost surface 46 that includes a specially formulated composition that is UV resistant, and this is again done as part of the continuous pole forming process. Example UV resistant compositions useful for forming such coating include those having siloxane and/or urethane modification, such as the PSX-700 resins available from PPG. Such UV resistant compositions can also include desired fillers and/or pigments and/or additives to provide a desired pole outer surface texture and/or color, and/or to further contribute to the coating's UV resistance. In an example embodiment, the UV resistant coating is formed from a weatherable low viscosity epoxy resin composition. Since UV resistance is a property that is not required for the internal structure of the pole, the resin composition that is used to provide the outside coating can be different from the resin materials used to form the above-described internal structural elements of the pole.

The UV resistant coating can be applied by conventional dispensing or spraying technique to provide a desired coating thickness, which is understood to vary depending on the particular UV resistant material that is used and the particular pole end-use application. Alternatively, the UV resistant coating can be applied in the form of a saturated veil or gauze material disposed as a surface of the outside wall structure 40 to provide a desired coating thickness. In an example embodiment, the UV resistant layer (be it provided in the form of a resin coating or in the form of a saturated fabric material) is in the range of from about 0.004 to 0.04 inches, and preferably in the range of from about 0.004 to 0.008 inches. Further, the UV resistance can be obtained or improved by applying a layer of solid material, e.g., particles or grains such as sand or the like, to the pole outer surface that acts as a barrier to UV radiation to protect the underlying pole structure. If desired, the particles can be adhered to an underlying surface of UV resistant resin or the like to provide a further degree of UV resistance to the pole.

It is desired that poles of this invention be constructed having an optimized structure; namely, one constructed so that all structural elements fail under tension or compression at the same time. For example, it is desired that poles of this structure be constructed to fail on the tensile side at the same load as failing on the compressive side. In an example embodiment, the polymer mortar will fail in tension at about 3,000 psi, and at a low strain to failure. The strain and strength to failure can be increased dramatically by fiber reinforcement so it roughly matches a desired 2.4% strain to failure of the axial glass on the tensile side at 150,000 psi tensile strength in the axial fiber reinforced resin layer.

On the compressive side, the pole wall is preferably thick enough to resist local buckling up to the failure load on the tensile side. The crush strength must also be sufficient to resist the failure force or load on the tensile side. The optimum polymer mortar layer or core will crush at about the same load as the local pole structure fails in compressive buckling. The wall thickness is preferably increased to meet the buckling requirements. At this point the wall must also resist crush. Typically the wall thickness required for buckling is sufficient to resist crush, so some material savings can be achieved by adjusting the polymer mortar for lower compressive strength or higher strain to failure on the tensile side to optimize the overall pole structure. A key element of this is the understanding that the axially-oriented fiber reinforced resin layer can provide tensile strength up to 150,000 psi, but typically crushes based on the strength of the resin matrix since the very small diameter glass fibers have no local buckling resistance without support from the resin matrix. Typical crush resistance of an axial glass saturated and cured in a resin matrix is in the order of 20,000 to 25,000 psi.

Accordingly, poles of this invention are constructed comprising some amount of axially-oriented fiber reinforced resin (provided in the inside wall structure and/or in the outside wall structure) for providing optimum axial tensile strength and stiffness, with the polymer mortar core providing overall compressive and buckling strength equal to or greater than that of the tensile strength side of the pole. In an example embodiment, the polymer mortar layer or core has improved compressive strength equal to, or as close as possible to, the tensile strength of the axially-oriented fiber reinforced resin layer, which is about 150,000 psi. Further, it is desired that the poles of this invention be optimized so that the overall compressive and buckling strength matches the tensile strength of the pole by modifying the thickness and compressive strength to failure of the polymer mortar layer or core so that failure from buckling occurs at about the same time as failure from crush.

Poles of this invention are preferably formed by a continuous process using an apparatus comprising a series of devices that are configured and positioned to provide such continuous pole forming process. In such continuous process, the different structural features and elements of the pole described above are provided during sequential stages of a continuous process that at a starting point at one end of a rotating mandrel begins with a bare mandrel, and that at a finishing point at the opposite end of the mandrel results in the formation of the completed pole, i.e., without stopping the process and/or without removing an intermediate pole construction from the mandrel.

Figure 4:
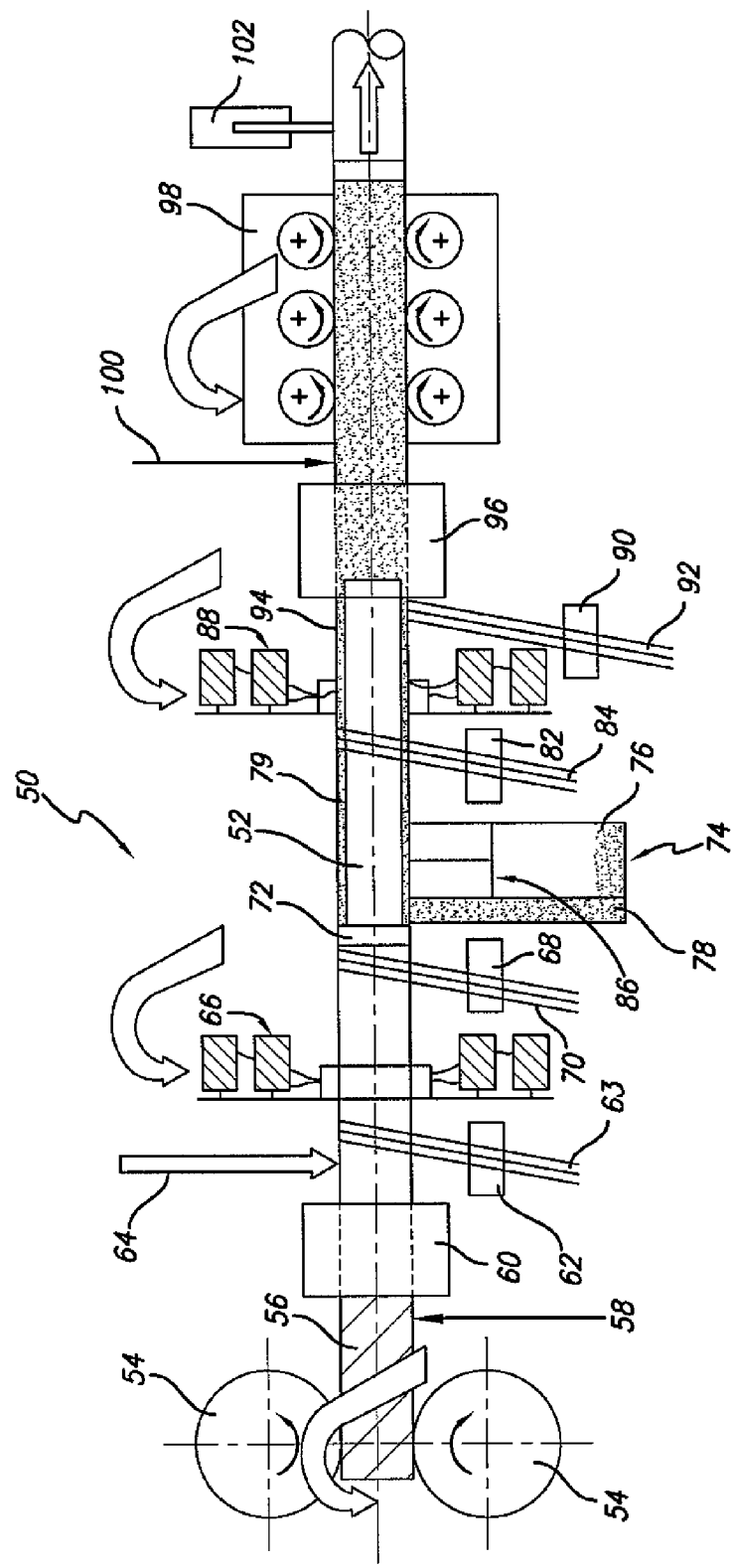
FIG. 4 is a schematic view of an apparatus used for making the pole of FIGS. 1 and 2 according to an example continuous process.

FIG. 4 illustrates in side schematic an embodiment of a continuous process 50, and the various devices for implementing the same, for making fiber reinforced resin poles of this invention. This particular continuous process is one that comprises two axial dispensement heads. Poles of this invention as described above are made in the following manner by this process 50. A mandrel 52 sized having a desired outside diameter and a desired length is rotatably mounted by a stationary support member (not shown) positioned at one end of the mandrel. The mandrel is positioned so that it extends between a number of pole fabrication stations as further described below.

Moving from left to right in FIG. 4, one or more rolls 54 are positioned adjacent an outside surface of the mandrel 52, and are configured to dispense a layer of a release material 56 in the form of a sheet material onto the mandrel surface. In an example embodiment, at least four rolls 54 are used to dispense four sheets of release material onto the mandrel, and the release material is one capable of being moved axially along the mandrel outside surface as the mandrel continues rotating to facilitate the conveyor-like axial movement of the pole construction along the mandrel. In an example embodiment, the release material can be in the form of kraft paper, mylar, cellophane, aluminum foil or the like. The release material is dispensed so that it preferably covers the outside surface of the mandrel thereby forming a tube that is both capable of moving axially along the mandrel to subsequent pole fabrication stations, and protecting the mandrel from the subsequently disposed materials that will be applied thereto during the pole forming process.

In an example embodiment the release material can be coated with glue or can be saturated with a resin material. This can be done for the purpose of getting the sheets or release material to adhere to one another and to confirm closely to the shape of the underlying mandrel. The glue or resin can be applied via a suitable spray or coating station 58 that is positioned downstream from the rollers 54. A heating station 60 is positioned downstream from the winding station 58 and can be provided in the form of an oven or the like for the purpose of drying the wetted release material for forming a tube structure having an outside diameter that closely conforms to an outside diameter of the mandrel for subsequent pole fabrication steps.

The tube structure exiting the heating station 60 is now ready to be passed to one or more stations that are used to produce the inside wall structure as described above. In this example embodiment, the inside wall structure includes both radially wound and axially directed resin reinforcing fibers. The tube structure exiting the heating station 60 passes to a first winding station 62 where reinforcing fiber material 63 is wound radially around the tube at a desired angle relative to the mandrel axis. The reinforcing fiber material can be wetted, saturated or impregnated with resin before being wound around the tube, and/or the desired resin material can be disposed onto the tube before or after the reinforcing fiber material is wound therearound. In an example embodiment, the resin material is impregnated through a resin bath prior to being applied to the mandrel.

While the example process illustrated in FIG. 4 is one that depicts applying a radially-oriented fiber reinforced resin winding downstream from the heating station 60, it is to be understood that the radially oriented fiber reinforced resin winding can be applied upstream from the oven if desired. In which case the first winding station 62 would be positioned upstream of the heating station 60, and wherein such heating station would operate to harden the resin in the fiber reinforced resin winding, thereby forming a hoop-reinforced structure. Before forming the inside wall structure, it may be desired that a layer of liner resin be applied onto the tube structure via a liner resin dispensing station 64. Application of a liner resin at this early stage of manufacturing the pole is optional and can be used in an example situation where the release material is a non-glue paper and such liner resin can be useful for gluing and/or sealing such release material.

In an example embodiment, using first radial or hoop windings of fiber reinforced resin material to form the inside wall structure is desired because this helps reinforce the circular stiffness of the inside traveling tube. It is to be understood, however, that there may be cases where the axially-oriented fiber reinforced resin rovings are applied first, and such rovings are covered by the radial or hoop windings.

Moving downstream from the first winding station 62, the tube now carrying the radial winding of fiber reinforced resin material 63 is passed to a first axial deployment station 66 that is configured to deposit a number of fiber reinforced resin rovings axially onto the underlying radial windings. In an example embodiment, the first axial deployment station 66 is in the form of spinning creels that are configured to dispense multiples rovings of the reinforcing fiber material longitudinally or axially onto underlying radial winding in a manner such that the longitudinal edges of the individual reinforcing material rovings abut, overlap, or are spaced apart from one another. The first axial deployment station 66 rotates with the mandrel and in an example embodiment deploys 168 fiber reinforced resin tows onto the underlying substrate. The reinforcing fiber material is wetted, saturated or impregnated with a desired resin before, during or after it has been deployed onto the underlying radial windings.

A second winding station 68 is positioned downstream from the first axial deployment station 66 and is configured to wind reinforcing fiber material 70 radially around the body of axially disposed fiber reinforced resin rovings dispensed by the axial deployment station. The reinforcing fiber material that is used is wetted, saturated or impregnated with a desired resin before, during or after it has been dispensed onto the underlying axial windings. The intermediate pole construction exiting the second winding station is one comprising the inside wall structure 72.

The pole construction now comprising the inside wall structure 72 is passed along to one or more downstream stations used for forming the polymer mortar intermediate layer or core. Thus, moving downstream from the second winding station 68, the apparatus for performing the continuous pole fabrication process comprises a polymer mortar dispensing station 74. The polymer mortar dispensing station 74 can be configured to dispense both the solid and liquid constituents of the polymer mortar material together and/or to dispense one or the other of the solid or liquid constituents separately.

In an example embodiment, the polymer mortar dispensing station 74 is configured to dispense the solid constituent 76, e.g., in the form of sand, onto an underlying surface of the pole that is wetted with a desired liquid constituent, e.g., a resin material. In an example embodiment where the polymer mortar intermediate core or layer is formed from a number of repeated polymer mortar and carrier material layers, the solid constituent is applied onto an underlying surface of the carrier material after the carrier material has been wound onto an outer surface of the intermediate pole structure. The carrier material 78 is wetted, saturated or impregnated with a desired resin useful for forming the polymer mortar material. The carrier material can be formed from the materials noted above, and in a preferred embodiment is formed from a paper material or a low cost veil fabric. The carrier material is wound onto an outside surface of an underlying intermediate pole structure via a third winding station (not shown). In an example embodiment, such as that illustrated in FIG. 2, multiple repeating layers of the saturated carrier material and sand are applied to build a polymer mortar layer or core 79 having a desired overall wall thickness. Alternatively, as noted above, the pole may comprise a polymer mortar core that is formed without having the multiple intervening windings of carrier material.

During the process of forming the polymer mortar layer or core, the sand 76 being dispensed from station 74 sticks to the surface of the underlying resin saturated carrier material and effectively applies one layer of sand for each layer of the carrier material. The excess sand not in contact with the resin saturated carrier material falls off of the pole as it rotates and is recovered for reuse. If desired, further steps or techniques can be used to control the layer thickness of the sand, such as by using a metering stick or the like.

Moving downstream from the polymer mortar dispensing station 74, the continuous pole fabrication process comprises a forth winding station 82 that is used for applying a layer of hoop roving 84 onto the polymer mortar layer 79 as discussed above in relation to the example pole embodiment illustrated in FIG. 2. Additionally, a vibration station (not shown) is positioned adjacent the polymer mortar dispensing station 74 for the purpose of consolidating the polymer mortar layer or core. In an example embodiment, the hoop roving can be applied simultaneously while the polymer mortar core is being vibrated, e.g., a vibrating device is positioned so that it vibrates the pole structure upon applying the hoop roving, to consolidate the sand, resin and carrier material, and to remove excess resin and air. The simultaneous winding of the hoop roving helps in the consolidation process and helps to hold the polymer mortar material in the consolidated condition, e.g., the roving tightens as the polymer mortar core is consolidated.

Once the polymer mortar layer or core 79 is formed, the pole is moved axially along the mandrel to one or more stations that are configured for fabricating the outside wall structure. Accordingly, downstream from the fourth winding station 82, used to apply the hoop roving 84, is a second axial deployment station 88 that is configured to deposit a number of reinforcing fiber material rovings axially onto the underlying polymer mortar layer or core. In an example embodiment, the second axial deployment station 88 is configured to dispense the fiber reinforced resin material longitudinally or axially onto the underlying hoop layer such that the longitudinal edges of the individual reinforcing material rovings abut, overlap, or are spaced apart from one another. The second axial deployment station 88 rotates with the mandrel and in an example embodiment deploys 168 tows of fiber reinforced resin onto the underlying substrate. The reinforcing fiber material is wetted, saturated or impregnated with a desired resin before, during or after it has been deployed onto the underlying polymer mortar layer or core.

Moving downstream from the second axial deployment station 88, the continuous process includes a fifth winding station 90 that is configured to apply a winding of fiber reinforced resin material 92 radially around the axially disposed fiber reinforced resin strips. This can be done for the purpose of providing a desired degree of hoop strength to the pole. Together the axially and radially oriented layers of fiber reinforced resin disposed over the polymer mortar layer or core form the pole outside wall structure 94.

As noted above, it is desired that fiber reinforced resin poles of this invention include an outer surface that displays some degree of weather and/or UV resistance. Such UV resistance is provided by using certain compositions, with or without fillers, pigments and/or additives, having a desired degree of UV resistance in forming the outermost layers or outside surface layer of the pole. In an example embodiment, such UV resistant material is provided in the form of a composition, e.g., a UV resistant resin material, disposed onto the pole outside surface during or after formation of the outside wall surface. Thus, the continuous process used to make such example embodiment pole would be one comprising a coating station or the like downstream from the fifth winding station 90.

In alternative embodiments, such UV resistant material is provided in the form of a resin material that is used for forming one or more of the fiber reinforced resin layers used to make the outside wall surface. Thus, the continuous process used to make such alternative embodiment pole would be one where the UV resistant resin material is dispensed via one or both of the second axial deployment station 88 or fifth winding station 90. In an example embodiment, the UV resistant material is provided in the last hoop layer of reinforcing fiber material provided by the fifth winding station 90.

In addition or as an alternative to using a UV resistant material in the form of a composition, UV resistance can be provided by placing a solid material onto an outside surface of the pole. For example, solid material provided in the form of grains or particles such as sand or the like can be applied to an outer surface of the pole to protect the underlying structure from the effects of UV radiation. In such an example embodiment, the sand is applied onto a resin component on the pole structure that causes the sand to adhere thereto and form a bonded attachment when the resin component is hardened or cured. The sand operates to form a solid barrier along the outside surface of the pole to UV radiation.

Once the outside wall structure is formed, the pole is passed through a heating station 96 positioned downstream from the fifth winding station 90, and that can be in the form of an oven or the like for the purpose of curing the resin materials used to form the pole. While the example continuous process described above and illustrated in FIG. 4 illustrates two heating stations, 60 and 96 it is to be understood that continuous processes useful for making poles of this invention can include more than two heating stations, and that the heating stations can be positioned differently than described above to produce a desired heating effect on the pole, e.g., to drive out moisture and/or to progressively cure the resin materials used to make the pole during the continuous process.

The pole is then passed axially through the oven and into a pulling station 98 positioned downstream from the heating station 96, and that is configured to pull the pole axially along the mandrel. In an example embodiment, the pulling station 98 comprises a number of rotating elements that are in contact with the pole and that urge the pole to move axially along the mandrel. The pulling station 98 is preferably a rotating device that rotates with the mandrel, and that is operated to control the speed with which the pole is passed axially along the mandrel and through each of the above-identified stations.

A water spraying station 100 can be positioned between the second heating station 96 and the pulling station 98, and is used for spraying water onto the outside surface of the completed pole for the purpose to cool the pole for strengthening the pole and otherwise ready the pole for the subsequent pulling process.

A feature of poles made according to this continuous process is that the length of the pole can be adjusted as desired for a particular end use by simply cutting the pole from the mandrel at a point downstream from the pulling station 98. Accordingly, a traveling cutting station 102 that moves with the pole line speed is positioned downstream from the pulling station at a distance where the pole is separated from the mandrel. The length of the pole can be controlled by waiting a desired time after the pole exits the pulling station to make the cut, e.g., waiting a longer period of time before cutting results in a longer pole as the pole continues to travel axially through as it is continuously being made by the apparatus.

Figure 5:
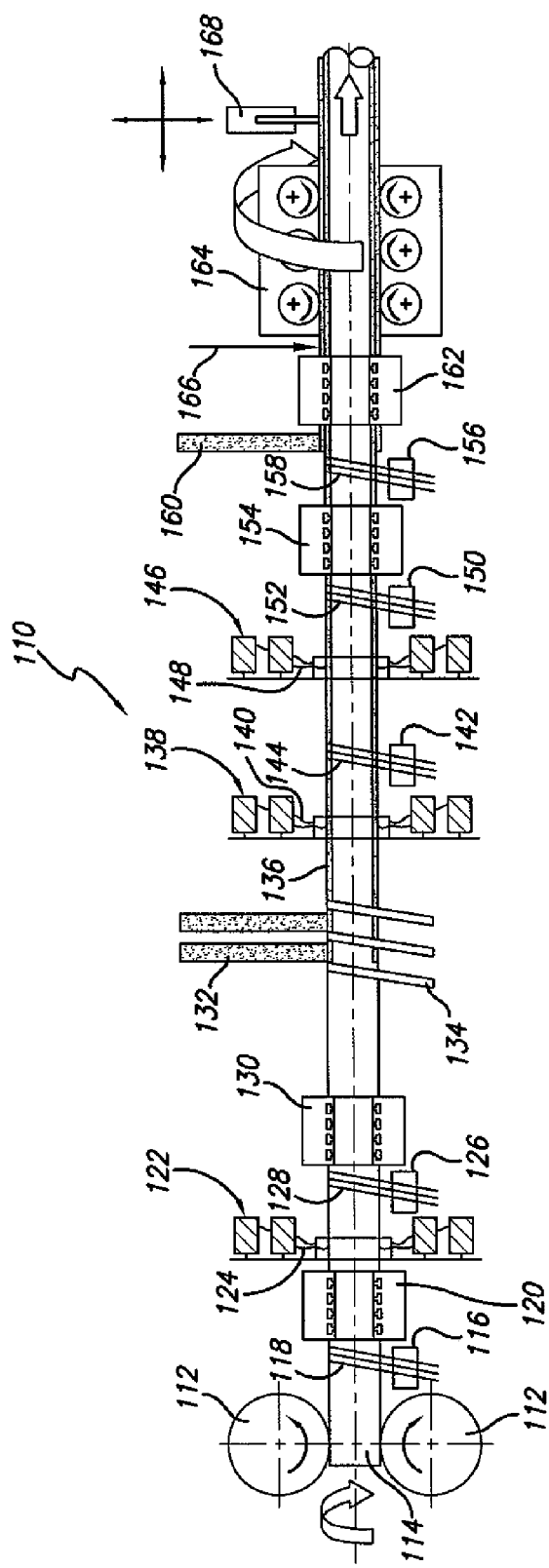
FIG. 5 is a schematic view of an apparatus used for making poles of this invention according to another example continuous process.

FIG. 5 illustrates another continuous process 110 useful for making poles of this invention that differs from that illustrated in FIG. 4 in that it includes three different axial deployment stations, and further introduces a solid constituent at more than one location. Specifically, the continuous process 110 includes a number of rollers 112 that are used to apply a release material such as paper or the like onto the mandrel. A first winding station 116 is positioned downstream from the rollers and is used to dispense a radial winding of fiber reinforced resin material 118 onto the release material covered mandrel. A first heating station 120 in the form of an oven is positioned downstream from the first winding station to fully or partially cure the resin component of the fiber reinforced resin material 118.

A first axial deployment station 122 is positioned downstream from the heating station and is used to dispense a plurality of resin impregnated fiber rovings 124 axially or longitudinally along the underlying radial winding. A second winding station 126 is positioned downstream from the first axial deployment station 122, and is used to dispense a radial winding of fiber reinforced resin material 128 onto the or over the underlying axial rovings, thereby forming the pole inside wall structure. A second heating station 130 is positioned downstream from the second winding station, and is used to partially or fully cure the resin in fiber reinforced resin layers used to form the inside wall structure.

One or more layers of polymer mortar material are applied to an outer surface of the inside wall structure. In an example embodiment, the polymer mortar material is provided in the form of sand 132 that is disposed via an appropriate dispensing station (not shown) onto an underlying surface of a carrier material 134 that is wetted, saturated and/or impregnated with a desired resin material and that is disposed onto the underlying pole surface. The carrier material can be formed from the same types of materials described above, and in the example embodiment is formed from paper. The carrier material is dispensed onto the rotating pole structure by a winding station (not shown) and is thereby wound radially around the underlying pole structure to form the desired polymer mortar layers or core 136.

In a preferred embodiment, the carrier material is provided in the form of three different windings (moving from left to right, wherein first and second windings are formed from kraft paper, and a third winding (disposed over the first and second windings) is formed from dexter paper. The use of the different types of paper as the carrier material is desired because the kraft paper has low porosity and minimizes resin transfer between allowing control of resin content. The kraft paper also acts as a fiber reinforcing material that can act as a crack stopper between layers of polymer mortar material. The dexter paper is low-cost tie down to hold the polymer mortar material in place.

A second axial deployment station 138 is positioned downstream from the stations used to form the polymer mortar layers or core, and is used to dispense a number of fiber reinforced resin rovings 140 onto the polymer mortar layers or core 136. A third winding station 142 is positioned downstream from the second axial deployment station 138 and is used to apply a radial winding of fiber reinforced resin material 144 onto the underlying pole structure comprising the axially-oriented rovings.

A third axial deployment station 146 is positioned downstream from the third winding station 142, and is used to dispense a number of fiber reinforced resin rovings or tows 148 onto the underlying poly structure comprising the radial winding of fiber reinforced resin material. A fourth winding station 150 is positioned downstream from the third axial deployment station 146 and is used to apply a radial winding of fiber reinforced resin material 152 onto the underlying pole structure comprising the axially-oriented rovings.

As contrasted with the continuous pole fabrication process illustrated in FIG. 3, the continuous pole fabrication process illustrated in FIG. 4, comprising the two axial deployment stations 138, 146 and radial winding station 142 interposed therebetween that are located downstream from the polymer mortar stations, is useful for producing a pole with a wall structure generally having a greater degree of tensile strength due to the additional amount of axially-oriented fiber reinforced resin rovings, which may be desired in certain end-use pole applications calling for an increased degree of tensile strength.

A third heating station 154 is positioned downstream from the fourth winding station 150 and can be in the form of an oven that is operated to partially or fully cure the resin used for making the preceding fiber reinforced resin material layers. A fifth winding station 156 is positioned downstream from the third heating station 154 and is used to wind a fiber reinforced resin material 158 radially onto the underlying pole structure. As noted in above, the resin material used to form such fiber reinforced resin material 158 can be selected to have certain desired UV resistant properties for the purpose of providing a pole having a desired level of UV resistance.

A solid material 160 in the form of particles or grains, e.g., such as sand or the like, is dispensed by an appropriate dispense station (not shown) that is positioned downstream from the fifth winding station 156 onto the surface of the just-dispensed radially wound fiber reinforced resin material 158. In an example embodiment, the solid material 160 is provided in the form of sand and is dispensed onto the surface of the radial winding, wherein the sand is wetted by the resin in the winding and thereby adheres thereto. The sand can be used in this process to provide a desired textured surface and/or may also operate as a UV barrier to provide a desired amount of UV resistance to the resulting pole.

The process 110 further includes a fourth heating station 162, a pulling station 164, a water spraying station 166, and a traveling cutting station 168 that are all configured to operate in the same manner noted above for the process illustrated in FIG. 3.

A feature of making poles of this invention using the process illustrated in FIG. 5 as contrasted with the process illustrated in FIG. 4 is that in particular, more axial fiber reinforced resin material, and more polymer mortar layers can be applied to the pole, thereby providing for additional axial tensile and compressive strength in the resulting pole structure.

Figure 6:
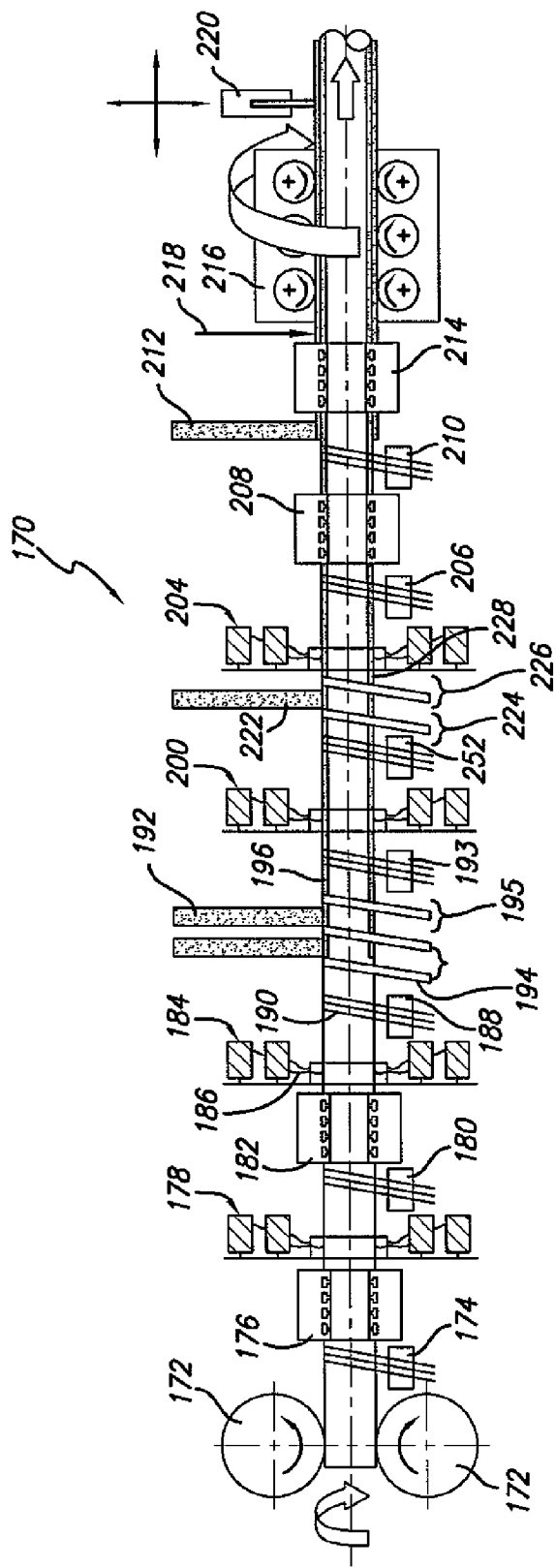
FIG. 6 is a schematic view of an apparatus used for making poles of this invention according to still another example continuous process.

FIG. 6 illustrates a still other continuous process 170 useful for making poles of this invention that differs from that illustrated in FIG. 5 in that it includes four different axial deployment stations, and further includes two rather than one station for forming the polymer mortar layer or core. Accordingly, poles made according to this process would be expected to generally have an additional degree of tensile and compressive strength when compared to the poles formed according to the processes illustrated in both FIGS. 4 and 5.

Generally, the process includes (moving sequentially downstream from left to right along FIG. 6) rollers 172, a first winding station 174, a first heating station 176, a first axial deployment station 178, a second winding station 180, and a second heating station 182 that operate in the same manner as the same stations described above and illustrated in the process of FIG. 5.

This process 170 further includes a second axial deployment station 184 that dispenses fiber reinforced resin rovings or tows 186 onto the underlying surface of radial fiber reinforced resin windings. A third winding station 188 is positioned downstream from the second axial deployment station 184, and dispenses a radial winding of fiber reinforced resin material 190 onto the surface of the axially-oriented rovings.

Accordingly, unlike the process illustrated in FIG. 5, the process of FIG. 6 is one resulting in the formation of an inside wall structure with an additional layer of both axial rovings and radial windings. These additional fiber reinforced resin layers provide an improved degree of both axially-directed tensile strength and radially-directed hoop strength when compared to the pole inside wall structure made according to the process of FIG. 5.

One or more layers of polymer mortar material are applied to an outer surface of the inside wall structure. The polymer mortar material is provided in the same manner described above and illustrated in FIG. 5, e.g., is provided in the form of sand 192 that is disposed via an appropriate dispensing station (not shown) onto an underlying surface of a carrier material 194 that is wetted, saturated and/or impregnated with a desired resin material. The carrier material is dispensed onto the rotating pole structure by a winding station (not shown) and is thereby wound radially around the underlying pole structure to form a first polymer mortar core 196, made up of a number of layers carrier material 194 and solid material 192. A tie down layer of material 195, e.g., dexter paper, is disposed over the polymer mortar core formed from the layers of carrier material and polymer mortar material.

A fourth winding station 198 is positioned downstream from the stations used to form the first polymer mortar layers or core 196 and is used to apply a hoop roving onto the first polymer mortar layers or core. If desired, a vibration station (not shown) can be positioned adjacent the winding stations 198 for the purpose of consolidating the core 196 with the aid of the hoop rovings applied in the winding station 198.

Moving downstream from the fourth winding station 198, the process illustrated in FIG. 6 includes a third axial deployment station 200, a fifth winding station 202, a fourth axial deployment station 204, a sixth winding station 206, a third heating station 208, a seventh winding station 210, a solid material dispensement station for dispending particles or gains such as sand 212, a fourth heating station 214, a pulling station 216, a water spray station 218 between the fourth heating station 214 and the pulling station 216, and a traveling cutting station 220. These stations perform substantially the same function as the same types of respective stations illustrated in the process of FIG. 4 that are positioned downstream from the polymer mortar dispensement station.

A difference, however, is that the process illustrated in FIG. 6 includes a second polymer mortar dispensement station interposed between the fifth winding station 202 and the fourth axial deployment station 204, that is used to dispense a desired solid material 222, e.g., in the form of particles or grains such as sand. The solid material 222 is dispensed onto a surface of the pole structure that is formed from a carrier material 224 that is wetted, impregnated or saturated with a desired resin material, and that has been wound radially onto the underlying radially-oriented fiber reinforced resin windings. Once applied, the solid material 222 is wetted by the resin and thereby adheres to the carrier material 224. A subsequent layer of carrier material 226 is wound around the adhered solid material to thereby form a second polymer mortar number of layers or core 228.

The subsequent layer of carrier material 226 can be formed from the same or different carrier material than that used to form the first layer of carrier material 224. In an example embodiment, both carrier material layers are formed from paper, wherein the first carrier material is formed from kraft paper and the second carrier material is formed from dexter paper. The use of the different types of paper for the carrier material is desired because the kraft paper has low porosity and minimizes resin transfer between layers thereby controlling the resin content in the polymer mortar layer, and also acts as a crack stopper. The dexter paper is used as a low cost tie down to hold the polymer mortar in place before applying additional windings in stations 204 and 206.

A feature of the pole resulting from the process illustrated in FIG. 6 is that it includes a first and second polymer mortar layers or cores 196 and 228. In such example embodiment, the second polymer mortar layers or core 228 is positioned within the pole outside wall structure and operates to add thickness and bulk to the outside wall structure, thereby providing an enhanced degree of compressive strength and buckling resistance to the pole structure.

While particular continuous processes have been described above and illustrated in FIGS. 4 to 6 for making polymer mortar poles of this invention, it is to be understood that such processes are only representative of many different types of continuous processes that can be used and that may be different from those described and illustrated. It is to be understood that such continuous processes are to be within the scope of this invention to the extent that they result in the formation of fiber reinforced resin polymer mortar poles of this construction having the construction features noted above.

A feature of using the continuous processes described above to form fiber reinforced resin poles of this invention is that they provide the flexibility to use different materials and/or different material proportions for different portions and to make changes on the run, without having to stop the process, thereby providing enhanced manufacturing efficiency. For example, this continuous fabrication process enables one to make a fiber reinforced resin pole comprising the use of different types of resins for different sections of the pole, e.g., the inside wall structure, the outside wall structure, and the outer UV resistant layer.

While certain example pole embodiments, and processes for making the same, have been described above and illustrated, a number of different pole embodiments are understood to be within the scope of this invention. For example, fiber reinforced resin poles of this invention can be constructed as noted above, i.e., having the polymer mortar intermediate layer or core, and additionally comprising a further polymer mortar material dispersed within the inside wall structure and/or the outside wall structure, e.g., as fabricated according to the process illustrated in FIG. 6. In such an embodiment, the polymer mortar dispersed within one or both of the inside and outside wall structures can be introduced during the process of forming the axially and/or radially-oriented fiber reinforced resin materials. In such embodiments, the polymer mortar material can be provided in the form of sand or the like that is dispersed onto an underlying layer of fiber reinforced resin or carrier material such that the sand adheres thereto and excess sand is removed therefrom before a subsequent layer of the reinforcing fiber or carrier material is dispensed thereover.

Accordingly, such example pole embodiments would be formed using a process similar to the one described above and illustrated in FIG. 6 that comprises dispensing the further polymer mortar material the steps useful for forming the outside wall surfaces, e.g., to include one or more additional stations positioned adjacent the stations used to dispense the axially- and/or radially-oriented fiber reinforced resin materials for the outside wall structures.

The exact number of polymer mortar layers or core, and the placement position of the polymer mortar layers or core within the pole structure can and will vary depending on a number of factors, such as the pole end-use application and the materials selected for forming the pole. Accordingly, it is to be understood that in such other embodiments of the pole, the polymer mortar material can be dispersed along locations of the pole in addition to the polymer mortar intermediate layer or core (as illustrated in FIGS. 2 and 3).

In another example, fiber reinforced resin poles of this invention can be constructed without having a polymer mortar intermediate layer or core as described above and as illustrated in FIGS. 2 and 3, e.g., one that is interposed between the inside and outside wall structures. In such example embodiments, the pole is constructed comprising the polymer mortar material positioned along one or both of the inside and outside wall structures. Since this particular pole embodiment does not include a centralized or intermediate polymer mortar layer or core, the transition between the inside and outside wall structure may not exist, and the entire pole structure can be considered a structural wall.

In such an embodiment, the polymer mortar material can be dispersed over all or some of the axially and/or radially oriented fiber reinforced resin layers and/or carrier material to provide a desired wall structure that will provide the above-described tension and compression properties desired to provide the degree of tensile, compression and buckling resistance needed for a particular pole end-use application. Accordingly, it is to be understood that the wall thickness of poles according to this example embodiment can and will vary depending such factors as the number of polymer mortar layers disposed therein, the types of materials used to form the pole, and the pole end-use application.

In such an embodiment, wherein the pole does not include a central or intermediate polymer mortar layer or core, the polymer mortar material can be provided in the form of sand or the like that is dispersed onto an underlying layer of fiber reinforced resin or carrier material such that the sand adheres thereto, and excess sand is removed therefrom before a subsequent layer of the reinforcing fiber or carrier material is provided. Accordingly, such example pole embodiment can be formed using a continuous process similar to the ones described above and illustrated in FIGS. 4 to 6 that have been modified to remove the stations used for providing the polymer mortar intermediate layer or core, and instead comprising one or more stations positioned adjacent the stations used to dispense the axially and/or radially oriented fiber reinforced resin materials for providing the inside and/or outside wall structures.

Poles of this invention can be fabricated having an outside surface that is relatively smooth, e.g., that is formed from a final layer of fiber reinforced resin material, or having an outside surface formed from a coating of a UV resistant material. Alternatively, poles of this invention can be constructed having a surface with some desired degree of texture, depending on the particular pole end-use application. For example, poles of this invention can be constructed having an texturized outside surface provided by dispensing sand or other particulate matter onto the outermost surface of the outside structural wall during the process of making the pole, as illustrated in FIGS. 5 and 6. In such embodiment, the sand sticks to the resin component in the underlying fiber reinforced resin layer, and the excess sand is removed. After curing, the pole outside surface has a texture that enables one to grip or handle the pole without slipping and without causing injury by cutting or the like. Additionally, the outermost surface of sand operates as a barrier material to provide a degree of UV protection to the underlying structure of the pole.

In addition to the materials described above for forming the various layers of fiber reinforced poles of this invention, it is to be understood that other materials such as fillers, pigments, and other performance agents can be used. For example, in the embodiment described above where the outermost surface of the pole comprises a texturized surface formed from sand, it may be desirable to use a resin material, e.g., forming the outermost surface of the pole, comprising a pigment for matching the color of the resin to the sand. This may be desired so that as the sand is removed from the pole, e.g., by wear or by ablative process of the resin, the appearance of the pole will not change and will be the same color.

Although, limited embodiments of fiber reinforced resin poles and continuous processes for making the same have been described and illustrated herein, many modifications and variations will be apparent to those skilled in the art. Accordingly, it is to be understood that within the scope of the appended claims, fiber reinforced resin poles and continuous processes for making the same of this invention may be embodied other than as specifically described herein.

What is claimed is:

1. A fiber reinforced resin pole comprising an annular body having a central opening extending therethrough between opposed axial pole ends, the body having a wall structure comprising:
    an inside wall portion forming an innermost pole diameter, an outside wall portion forming an outermost pole diameter, and an intermediate wall portion interposed therebetween,
    wherein the inside and outside wall portions each comprise a number of fiber reinforced resin layers,
    wherein the intermediate wall portion is formed from a first layer of paper having a first porosity and two or more layers of a polymer mortar material that comprises sand particles dispersed within a hardened polymeric material, the two or more layers of polymer mortar material being separated from one another by a carrier material, wherein the carrier material includes a second layer of paper, wherein the carrier material is impregnated with a material that forms a bond with the polymer mortar material,
    wherein the second layer of paper has a second porosity that is higher than the first porosity,
    wherein at least one of the inside or outside wall portions comprises fiber reinforced resin layers that are oriented longitudinally therein and parallel to an axis running between the pole ends, and
    wherein the inside and outside wall portions are free of the polymer mortar material.

2. The fiber reinforced resin pole as recited in claim 1 wherein the inside and outside wall portions each comprise fiber reinforced resin layers that are oriented radially within the wall structure at an angle of between about 70 to 90 degrees relative to the axis running between the pole ends.

3. The fiber reinforced resin pole as recited in claim 1 wherein the intermediate core comprises chopped fibers disposed in the polymer mortar material.

4. The fiber reinforced resin pole as recited in claim 1 wherein the hardened polymeric material is a cured resin material.

5. The fiber reinforced resin pole as recited in claim 4 wherein the resin material further includes a coupling agent to provide an improved bond between the hardened material and the sand.

6. The fiber reinforced resin pole as recited in claim 5 wherein the coupling agent is selected a silicon-containing compound.

7. The fiber reinforced resin pole as recited in claim 1 further comprising an outer surface formed from an ultra violet resistant material, wherein the ultra violet resistant material is selected from the group of materials consisting of resin materials, particulate materials, and mixtures thereof.

8. The fiber reinforced resin pole as recited in claim 1 wherein wall fiber reinforced resin layers used to form the wall structure comprises at least 50 percent longitudinally-oriented fiber reinforced resin layers.

9. The fiber reinforced resin pole as recited in claim 1 wherein the carrier material is impregnated with the hardened polymeric material forming the polymer mortar material.

10. The fiber reinforced resin pole as recited in claim 1 wherein the second layer of paper comprises dexter paper and the first layer of paper comprises kraft paper.

11. A fiber reinforced resin pole comprising an annular body having a central opening extending therethrough between opposed axial pole ends, the annular body comprising:
    an inside wall portion, an outside wall portion, wherein the inside and outside wall portions each comprise a number of fiber reinforced resin layers; and
    an intermediate wall portion interposed between the inside wall portion and the outside wall portion, wherein the intermediate wall portion comprises two or more layers of a polymer mortar material that includes sand particles dispersed within a hardened polymeric material, the two or more layers of polymer mortar material being separated from one another by a carrier material,
    wherein the carrier material consists of layers of paper impregnated with a material that forms a bond with the polymer mortar material, wherein the carrier material includes a first layer of paper having a first porosity, and a second layer of paper having a second porosity, wherein the second porosity is lower than the first porosity.

* * * * *